US011521418B2

(12) United States Patent
Wu

(10) Patent No.: US 11,521,418 B2
(45) Date of Patent: Dec. 6, 2022

(54) DISPLAY CONTROL METHOD, ELECTRONIC DEVICE, AND STORAGE MEDIUM

(71) Applicant: BEIJING XIAOMI MOBILE SOFTWARE CO., LTD., Beijing (CN)

(72) Inventor: Jing Wu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/203,334

(22) Filed: Mar. 16, 2021

(65) Prior Publication Data

US 2022/0036035 A1 Feb. 3, 2022

(30) Foreign Application Priority Data

Jul. 31, 2020 (CN) .......................... 202010760730.7

(51) Int. Cl.
| | | |
|---|---|---|
| *G06V 40/13* | (2022.01) | |
| *G06F 3/041* | (2006.01) | |
| *G06V 40/60* | (2022.01) | |
| *G06F 3/04817* | (2022.01) | |
| *G06F 3/0488* | (2022.01) | |

(52) U.S. Cl.
CPC ........ *G06V 40/1312* (2022.01); *G06F 3/0412* (2013.01); *G06F 3/0488* (2013.01); *G06F 3/04186* (2019.05); *G06F 3/04817* (2013.01); *G06V 40/63* (2022.01)

(58) Field of Classification Search
CPC ............ G06K 9/00033; G06K 9/00919; G06F 3/0412; G06F 3/04186; G06F 3/04817; G06F 3/0488
See application file for complete search history.

(56) References Cited

U.S. PATENT DOCUMENTS

| | | | |
|---|---|---|---|
| 2015/0123929 A1 | 5/2015 | Bang et al. | |
| 2018/0114047 A1* | 4/2018 | Kim | ..................... G06K 9/0002 |
| 2018/0275814 A1* | 9/2018 | Hosokawa | ................ G06F 3/14 |

FOREIGN PATENT DOCUMENTS

| | | | |
|---|---|---|---|
| EP | 3309667 A1 * | 4/2018 | ............. G06F 21/32 |
| EP | 3309667 A1 | 4/2018 | |

OTHER PUBLICATIONS

European Patent Application No. 21165474.4 Search Report and Opinion, dated Sep. 28, 2021, 11 pages.

* cited by examiner

*Primary Examiner* — Jonathan A Boyd
(74) *Attorney, Agent, or Firm* — Lathrop GPM LLP

(57) ABSTRACT

The present disclosure relates to a display control method, an electronic device, and a storage medium. The method includes: obtaining at least one frame of sensing data representing motion of a target object relative to an electronic device; predicting a to-be-identified region on the electronic device according to the sensing data; and displaying preset information in the to-be-identified region. The preset information is configured to indicate to input biometric information of the target object.

17 Claims, 5 Drawing Sheets

DISPLAY CONTROL METHOD, ELECTRONIC DEVICE, AND STORAGE MEDIUM

CROSS-REFERENCE TO RELATED APPLICATION

This application claims priority to and benefits of Chinese Patent Application Serial No. 202010760730.7, filed with the State Intellectual Property Office of P. R. China on Jul. 31, 2020, the entire content of which is incorporated herein by reference.

TECHNICAL FIELD

The present disclosure relates to a field of display technology, and more particularly, to a display control method, an electronic device, and a storage medium.

BACKGROUND

At present, with the development of OLED (organic light emitting diode) technology, more and more electronic devices adopt an in-display fingerprint unlocking function. In an always-on mode, a fingerprint icon is always displayed on a designated position of the display screen, the designated position corresponding to a central area of a fingerprint sensor. A user may press a finger on the above fingerprint icon. After the electronic device detects that the finger is pressed on the fingerprint icon, a light spot is displayed on the designated position of the display screen, and then steps such as fingerprint entry and unlocking are performed.

However, in the way of displaying the fingerprint icon and lighting up the light spot at the designated position 11 as shown in FIG. 1, the user may be required to move his or her finger to the designated position, or the user may be even required to repeatedly adjust his or her finger position when the deviation is large, which compromises the fingerprint unlocking experience.

SUMMARY

According to a first aspect of embodiments of the present disclosure, there is provided a display control method, including: obtaining at least one frame of sensing data representing motion of a target object relative to an electronic device; predicting a to-be-identified region on the electronic device according to the sensing data; and displaying preset information in the to-be-identified region. The preset information indicates to input biometric information of the target object.

According to a second aspect of embodiments of the present disclosure, there is provided a display control apparatus, including: a first obtaining module, configured to obtain at least one frame of sensing data representing motion of a target object relative to an electronic device; a second obtaining module, configured to predict a to-be-identified region on the electronic device according to the sensing data; and a display module, configured to display preset information in the to-be-identified region. The preset information indicates to input biometric information of the target object.

According to a third aspect of embodiments of the present disclosure, there is provided an electronic device, including: a processor; and a memory configured to store computer programs executable by the processor. The processor is configured to execute the computer programs to implement the steps in the above-mentioned methods according to any one of the above embodiments.

According to a fourth aspect of embodiments of the present disclosure, there is a computer-readable storage medium. When executable computer programs in the storage medium are executed by a processor, the steps in the above-mentioned methods according to any one of the above embodiments is able to be implemented.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the present disclosure as recited in the appended claims.

Figure 1:
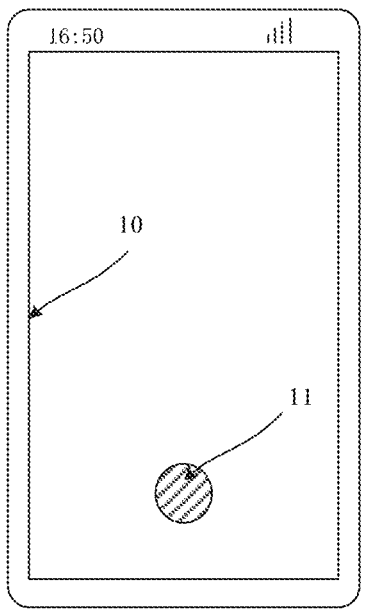
FIG. 1 is a schematic diagram of a fingerprint icon displayed at a designated position in the related art.
Figure 2:
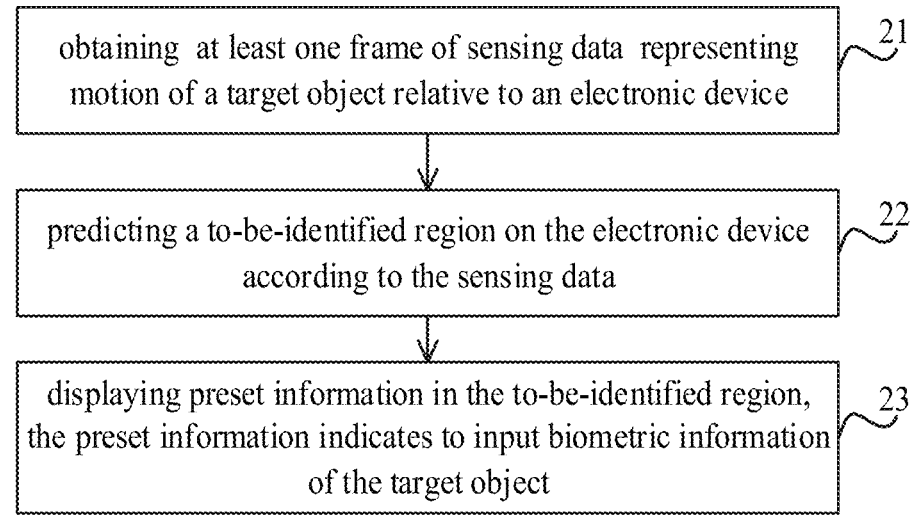
FIG. 2 is a flow chart illustrating a display control method according to an exemplary embodiment.

To solve above-mentioned technical problems, the present disclosure provides a display control method. FIG. 2 is a flow chart illustrating a display control method according to an exemplary embodiment. The display control method is applicable to an electronic device. The electronic device may include a smart phone, a personal computer, a server, or the like. The electronic device may include a tactile sensor, a display screen, and a biometric sensor arranged below the display screen. A size of the biometric sensor is larger than a preset size.

The tactile sensor may include at least one of a touch-sensitive display screen, a pressure sensor, an infrared sensor, and a light sensor. The tactile sensor may collect touch signals according to a preset period and send the touch signals to a processor of the electronic device. When the tactile sensor is a touch sensor, the touch signal may be a hovering touch signal. The processor may identify attribute information of the touch signal to obtain sensing data. The attribute information may include at least one of a size, quantity, and a characteristic of the touch signal. To facilitate understanding, a touch-sensitive display screen, usually referred to as a capacitive touch screen or a capacitive screen, with a capacitive sensor provided in the display screen is used to describe the solutions of the embodiments.

The biometric sensor may include at least one of a fingerprint sensor, an iris sensor and an auricle sensor. The fingerprint sensor will be taken as an example of the biometric sensor to describe the solutions of the embodiments in the following.

As illustrated in FIG. 2, a display control method, applied to an electronic device, may include steps at block 21 to block 23.

At block 21, at least one frame of sensing data representing motion of a target object relative to an electronic device is obtained.

In an embodiment, this can be achieved through a capacitive screen. An operating principle of the capacitive screen may be briefly described as the following. The capacitive screen creates a uniform electric field across a display screen. When a finger approaches or touches the display screen, a capacitance may be added to the display screen. Current from electrodes on the four sides of the display screen may flow to a touch point. Since current strength is proportional to a distance between the finger and an electrode, a position of the touch point may be calculated based on magnitudes of the current from the four electrodes. Based on this principle, the capacitive screen may collect a frame of touch signal according to a preset period and send the collected touch signal to a processor in the electronic device or store the collected touch signal in a local memory.

The processor in the electronic device may communicate with the capacitive screen or the local memory to obtain the touch signal. After that, the processor may process the touch signal. For example, processing each frame of touch signal may obtain a size, a position, or a characteristic (such as left, right, etc.) of an outline approached or touched by the target object, that is, a frame of sensing data may be obtained. For another example, processing multiple continuous frames of touch signals may identify a moving speed, a position, and a moving direction of the target object relative to the capacitive screen, to obtain a frame of sensing data. The closer the acquisition time of each frame of touch signal to the acquisition time of the latest touch signal that the capacitive screen can sense, the better the sensing data is, and the better it can reflect the movement of the target object relative to the electronic device.

In an embodiment, a cyclic storage area may be preset in the local memory. The cyclic storage area may be divided into at least one sub unit. Each sub unit is successively stored with one frame of sensing data according to a chronological sequence of acquisition time of the sensing data. After sensing data is stored in the last sub unit, a next frame of sensing data may cover the sensing data in the first sub unit, and so on. In this way, the processor may read the cyclic storage area according to a preset time interval or whenever the sensing data in the memory is updated to obtain required sensing data.

At block 22, a to-be-identified region on the electronic device is predicted according to the sensing data.

In an embodiment, the processor may predict the to-be-identified region based on the sensing data obtained at block 21. The to-be-identified region refers to a region used for displaying preset information on the display screen. The preset information is configured to indicate to input biometric information of the target object, for example, indicating the user to press his/her finger on the to-be-identified region to collect fingerprint information. The preset information may include one or more of a fingerprint icon, a light spot, and boundary of the to-be-identified region, which may be set according to specific scenarios. For example, the foregoing preset information may include a fingerprint icon or boundary of the to-be-identified region, which is applicable to a scenario where a fingerprint sensor is realized by a capacitive sensor or an ultrasonic sensor. For another example, in addition to the fingerprint icon and boundary of the region to be identified, the foregoing preset information may also include a light spot, which is applicable to a scenario where the fingerprint sensor is realized by an optical sensor.

Figure 3:
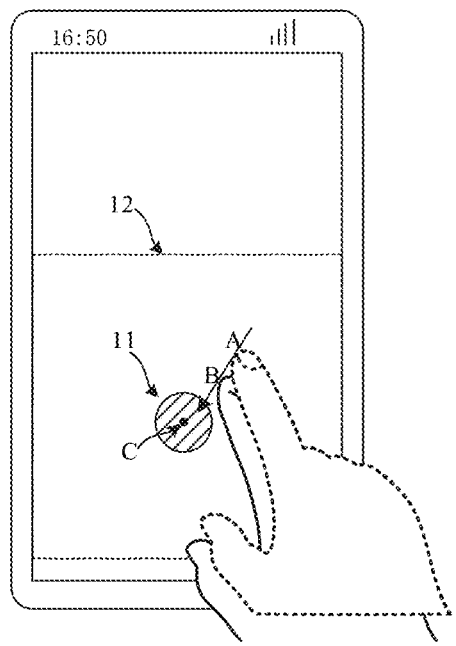
FIG. 3 is a schematic diagram of operating an electronic device in a far-to-near way according to an exemplary embodiment.
Figure 4:
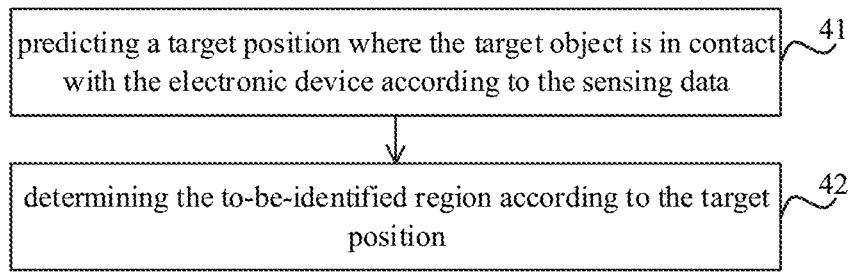
FIG. 4 is a flow chart of predicting a to-be-identified region according to an exemplary embodiment.

In an embodiment, the target object may be used to control the display screen in a far-to near way (non-contacting) as shown in FIG. 3, where, a finger moves from point A to point B, and point C is a predicted target position. The to-be-identified region 11 is generated by taking the point C as a central position. This is applicable to a scenario where a tactile sensor in the electronic device is a touch-sensitive display screen, an infrared sensor, or a light sensor. At this time, as illustrated in FIG. 4, predicting the to-be-identified region may include the following. At block 41, the processor may predict a target position where the target object is in contact with the electronic device according to the sensing data. The target object may be a human finger pulp, a human toe pulp, or a nose of a cat or a dog. The target object contains a biological characteristic that can uniquely reflect the target object. At block 42, the processor may determine the to-be-identified region according to the target position. A size of the target position may be set according to an area of a preset part of the target object. For example, when the preset part is the finger pulp, the area of the to-be-identified region may be greater than or equal to an area of a thumb pulp, to facilitate accommodating each finger of the user.

For the action at block 42, determining the to-be-identified region may include the following manners.

In a first manner, a preset shape and a preset size of the to-be-identified region may be pre-stored in the electronic device. The preset shape may be one of a circle, a rectangle, and an eye shape. The above-mentioned preset size is used to determine the size of the to-be-identified region, and may be set according to a size of the target object. After the target position is determined, a region with the preset size and the preset shape may be obtained by taking the target position as the center, and the region with the preset shape is determined as the to-be-identified region. For example, when the preset shape is a circle and a preset radius is R, a circle may be obtained based on the target position and the preset radius R, and the circle is the to-be-identified region.

Figure 5:
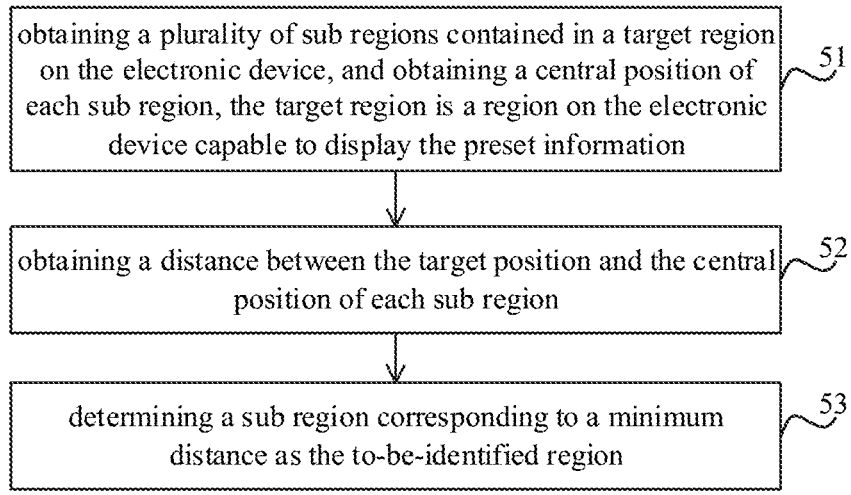
FIG. 5 is a flow chart of generating a to-be-identified region according to an exemplary embodiment.

In a second manner, as illustrated in FIG. 5, at block 51, the processor may obtain a plurality of sub regions (such as 3000 pixels*600 pixels) contained in a target region on the electronic device, and obtain a central position of each sub region. The target region is a region where the preset information is able to be displayed on the electronic device. For example, the target region may be a display area 12 facing the fingerprint sensor in the display screen, and the sub region may be obtained by dividing the above-mentioned target region. A division method can be regular division or random division. The central position of each sub region is determined during division. For example, when the sub regions are regularly divided, an intersection position of diagonals of a sub region may be taken as the central position of the sub region. For another example, when the sub regions are irregularly divided, a barycenter position of a sub region may be taken as the central position of the sub region. At block 52, the processor may obtain a distance between the target position and the central position of each sub region. The above-mentioned distance may be Euclidean distance. A distance between two points may be calculated according to the coordinates of the target position and the central position and Euclidean distance calculation formula. At block 53, the processor may sort all the sub regions according to the distances, and a sub region corresponding to a minimum distance is determined as the to-be-identified region.

In a third manner, the processor may obtain a plurality of sub regions contained in the target region, and obtain a central position of each sub region. An obtaining manner for obtaining the plurality of sub regions may refer to the above block 51. Then, the processor may predict which sub region the target object may fall into, and the sub region that the target object may fall into is the to-be-identified region.

Figure 6:
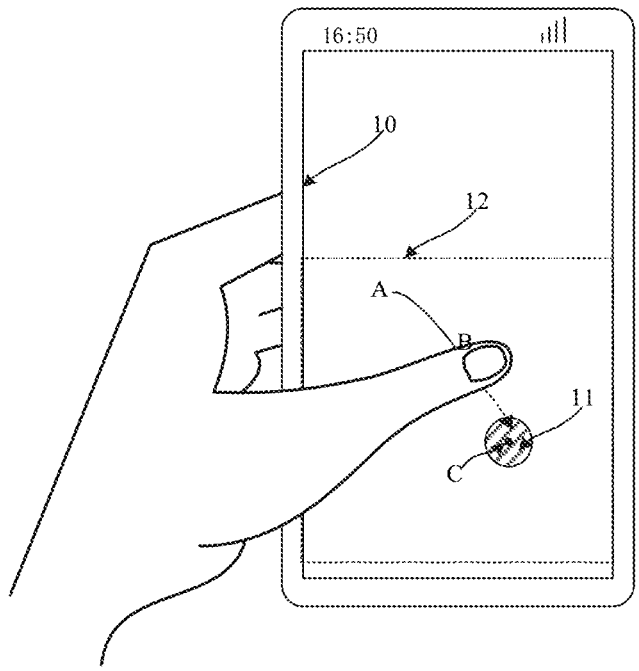
FIG. 6 is a schematic diagram of operating an electronic device by swiping from one side to the other side according to an exemplary embodiment.
Figure 7:
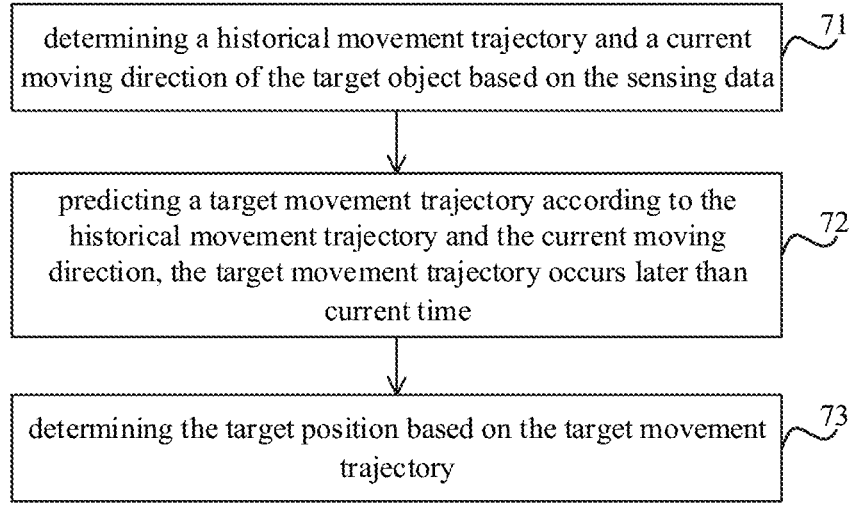
FIG. 7 is a flow chart of generating a to-be-identified region according to an exemplary embodiment.

In another embodiment, the target object may operate the display screen in a way of swiping from one side to the other (contacting) as shown in FIG. 6, where a finger swipes from point A to point B, and point C is a selected target position on a movement trajectory. The to-be-identified area 11 is generated by taking the point C as a central position. This is applicable to a scenario where a tactile sensor in the electronic device is a touch-sensitive display screen, a pressure sensor, an infrared sensor, or a light sensor. At this time, as illustrated in FIG. 7, determining the target position may include the following. At block 71, the processor may determine a historical movement trajectory and a current moving direction of the target object based on the sensing data. For example, the processor may determine a position of the target object according to each frame of sensing data, and obtains a piece of historical movement trajectory generated by the target object and a current moving direction according to the positions of a certain part of the target object in multiple continuous frames of sensing data and corresponding collection time. The multiple continuous frames of sensing data include sensing data collected at current time. The historical movement trajectory may be a trajectory AB as shown in FIG. 6. At block 72, the processor may predict a target movement trajectory has not been generated by the target object according to the historical movement trajectory and the current moving direction. The target movement trajectory may be a trajectory BC as shown in FIG. 6. At block 73, the processor may determine the target position based on the target movement trajectory. For example, the processor may select a point with a certain distance from the target object on the target movement trajectory as the target position. A specific method of determining the to-be-identified region based on the target position is the same as that at block 42, and will not be repeated here.

At block 23, the preset information is displayed in the to-be-identified region, and the preset information is configured to indicate to input biometric information of the target object.

In an embodiment, the processor may control the display screen to display the preset information in the to-be-identified region, such as displaying an icon and/or a light spot for indicating entry of biometric information in the to-be-identified region, an effect may be as shown in FIG. 3 and FIG. 6. In this way, when the user touches the display screen, the preset information may be displayed in the to-be-identified region immediately. Alternatively, a to-be-identified position may be predicted in advance, and the preset information may be displayed first, and then the user may just drop the finger naturally, instead of determining the position of displaying the preset information during a falling process of the finger until touching the screen. Alternatively, the finger may fall into the to-be-identified position just by slightly adjusting on the basis of a direction of its natural fall, i.e., adjusting referring to the position of displaying the preset information. The fingerprint sensor located under the display screen may collect fingerprint information, i.e., biometric information. After the fingerprint information is collected, the processor may also perform matching with a pre-stored fingerprint module to implement functions such as fingerprint information entry, fingerprint unlocking, and payment matching.

In the embodiments of the present disclosure, the at least one frame of sensing data representing motion of the target object relative to an electronic device may be obtained, the to-be-identified region on the electronic device may be predicted according to the sensing data, and the preset information is displayed in the to-be-identified region. The preset information is configured to indicate to input the biometric information of the target object. In this way, with this embodiment, the to-be-identified region may dynamically change with the sensing data, thus there is no need for the target object to input the biometric information at a fixed preset position, which is beneficial to improve the experience of using the information entry function. In addition, the time for displaying the preset information in the to-be-identified region may be earlier than the time when the target object reaches the to-be-identified region, so as to achieve the effect of guiding the target object to press the preset information, thus further enhancing the experience of using the information entry function.

The solution of the above display control method is described below in combination with an embodiment in which a user uses a mobile phone to achieve fingerprint unlocking. The solution includes the following.

Figure 8:
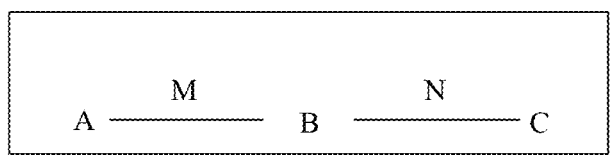
FIG. 8 is a schematic diagram of lighting up a corresponding region according to an exemplary embodiment.

A large area of fingerprint sensors is provided in the mobile phone. A target region corresponding to the fingerprint sensors on the display screen is divided into several sub regions in advance. A size of each sub region may be set to 3000 pixels*600 pixels. A position with two pieces of preset information (a fingerprint icon and a light spot) lighted up is defined as shown in FIG. 8. If a finger falls within a range of A to B, the fingerprint icon and the light spot may be displayed in region M. If the finger falls within a range of B to C, the fingerprint icon and the light spot may be displayed in region M.

Figure 9:
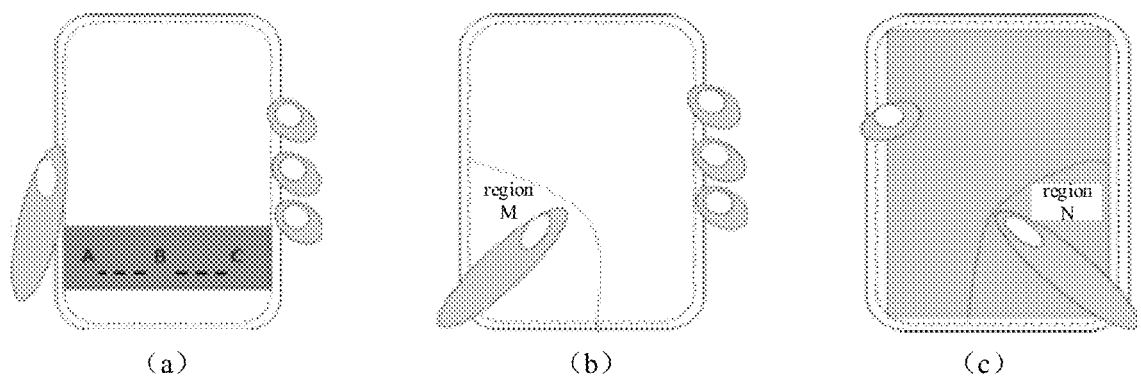
FIG. 9 is schematic diagrams lighting up a corresponding region according to an exemplary embodiment, in which (a) illustrating an effect of a user picking up a mobile phone, (b) illustrating an effect of lighting up a region M, and (c) illustrating an effect of lighting up a region N.

When the user picks up the mobile phone, an effect is shown in FIG. 9(*a*). The processor may distinguish the left hand or the right hand according to the sensing data collected by the capacitive screen, predict the to-be-identified position, and light up the fingerprint icon and light spot in the corresponding region to guide the user to perform unlocking. The effect is shown in FIGS. 9(b) and (c), where (b) shows a solution of displaying the fingerprint icon and the light spot in the region M, and (c) shows a solution of displaying the fingerprint icon and the light spot in region N.

Figure 10:
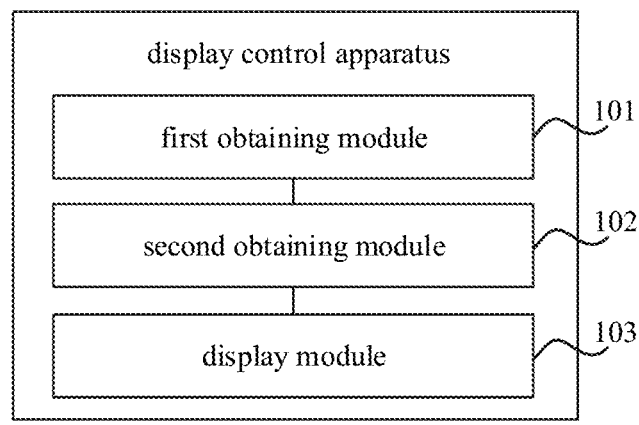
FIG. 10 is a block diagram illustrating a display control apparatus according to an exemplary embodiment.

On the basis of the above-mentioned display control method, embodiments of the present disclosure also provide a display control apparatus. Referring to FIG. 10, the apparatus includes a first obtaining module 101, a second obtaining module 102, and a display module 103.

The first obtaining module 101 is configured to obtain at least one frame of sensing data representing motion of a target object relative to an electronic device.

The second obtaining module 102 is configured to predict a to-be-identified region on the electronic device according to the sensing data.

The display module 103 is configured to display preset information in the to-be-identified region. The preset information is configured to indicate to input biometric information of the target object.

Alternatively, the second obtain module 102 includes a first determining unit and a second determining unit.

The first determining unit is configured to predict a target position where the target object is in contact with the electronic device according to the sensing data.

The second determining unit is configured to determine the to-be-identified region according to the target position.

Alternatively, the first determining unit includes a first determining sub unit, a predicting sub unit, and a second determining sub unit.

The first determining sub unit is configured to determine a historical movement trajectory and a current moving direction of the target object based on the sensing data.

The predicting sub unit is configured to predict a target movement trajectory according to the historical movement trajectory and the current moving direction, the target movement trajectory occurring later than current time.

The second determining sub unit is configured to determine the target position based on the target movement trajectory.

Alternatively, the second determining unit includes a generating sub unit and a third determining sub unit.

The generating sub unit is configured to generate a region of a preset shape centered on the target position based on a preset size.

The third determining sub unit is configured to determine the region of the preset shape as the to-be-identified region.

Alternatively, the second determining unit includes a first obtaining sub unit, a second obtaining sub unit, and a fourth determining sub unit.

The first obtaining sub unit is configured to obtain a plurality of sub regions contained in a target region on the electronic device, and obtaining a central position of each sub region, the target region being a region on the electronic device capable to display the preset information.

The second obtaining sub unit is configured to obtain a distance between the target position and the central position of each sub region.

The fourth determining sub unit is configured to determine a sub region corresponding to a minimum distance as the to-be-identified region.

Alternatively, the electronic device is provided with a touch sensor. The first obtaining module includes a collecting unit and a third obtaining sub unit.

The collecting unit is configured to collect a touch signal according to a preset period through the touch sensor.

The third obtaining sub unit is configured to identify attribute information of the touch signal to obtain the sensing data, the attribute information including at least one of a size, quantity, and a characteristic of the touch signal.

Alternatively, the touch signal is a hovering touch signal.

Alternatively, the displaying module includes a first display unit and/or a second display unit.

The first display unit is configured to display an icon for indicating to input biometric information in the to-be-identified region.

The second display unit is configured to display a light spot for inputting biometric information in the to-be-identified region.

It is understandable that the apparatus provided in the embodiments of the present disclosure corresponds to the foregoing method, and the specific content may refer to the content of respective embodiments of the method, which will not be repeated here.

Figure 11:
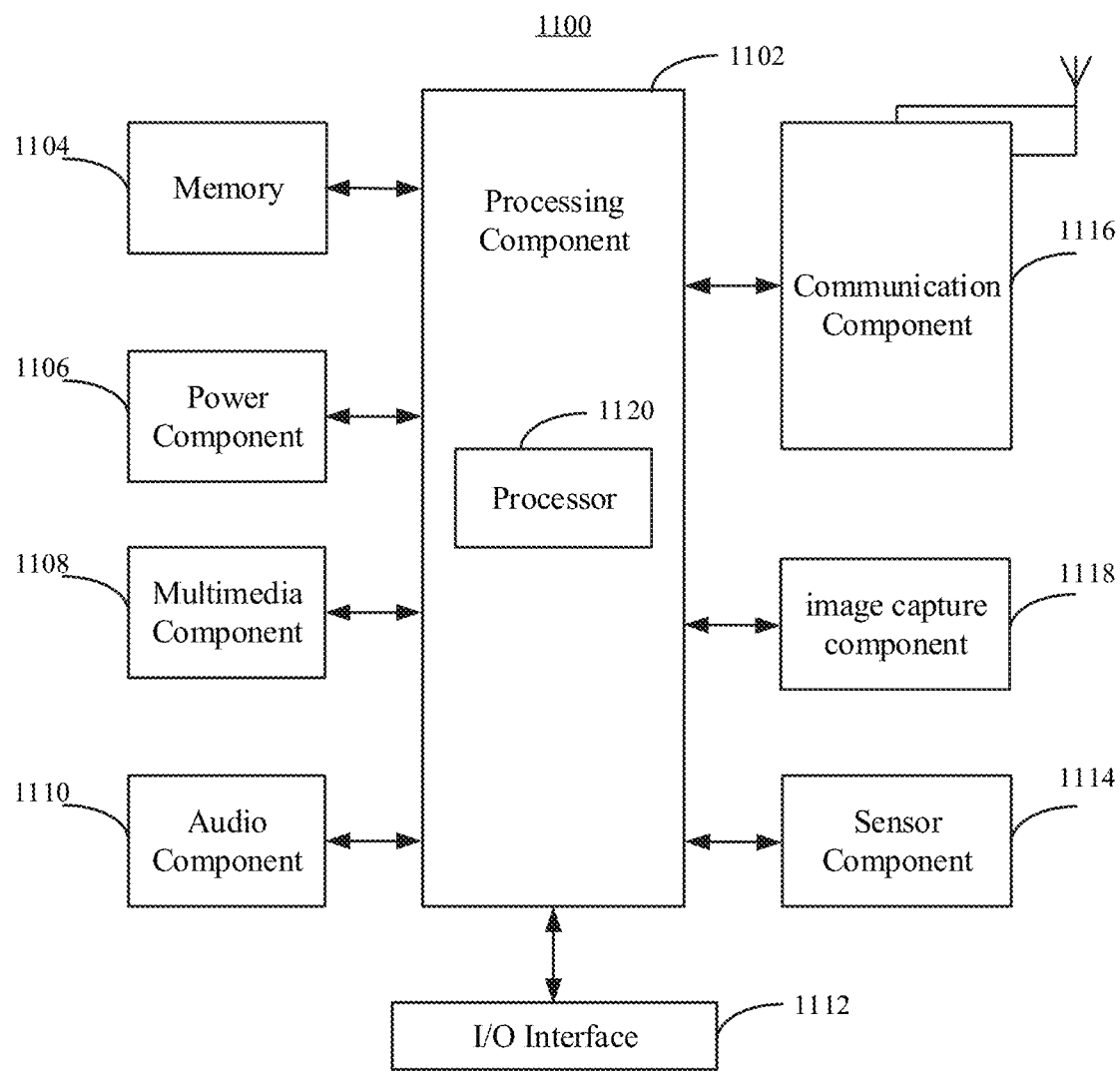
FIG. 11 is a block diagram illustrating an electronic device according to an exemplary embodiment.

FIG. 11 is a block diagram illustrating an electronic device according to an exemplary embodiment. For example, the electronic device 1100 may be a mobile phone, a computer, a digital broadcast terminal, a tablet, a medical device, exercise equipment, a personal digital assistant, and the like.

Referring to FIG. 11, the electronic device 1100 may include one or more of the following components: a processing component 1102, a memory 1104, a power component 1106, a multimedia component 1108, an audio component 1110, an input/output (I/O) interface 1112, a sensor component 1114, a communication component 1116, and an image capture component 1118.

The processing component 1102 typically controls overall operations of the device 1100, such as the operations associated with display, telephone calls, data communications, camera operations, and recording operations. The processing component 1102 may include one or more processors 1120 to execute computer programs. Moreover, the processing component 1102 may include one or more modules that facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the electronic device 1100. Examples of such data include instructions for any applications or methods operated on the electronic device 1100, contact data, phonebook data, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the electronic device 1100. The power component 1106 may include a power management system, one or more power sources, and any other components associated with the generation, management, and distribution of power in the electronic device 100. The power component 1106 may include a power chip, and a controller may communicate with the power chip to control the power chip to turn on or turn off a switching device, so that a battery supplies power to the main board circuit or does not supply power.

The multimedia component 1108 includes a screen providing an output interface between the electronic device 1100 and the user. In some embodiments, the screen may include a liquid crystal display (LCD) and a touch panel (TP). If the screen includes the touch panel, the screen may be implemented as a touch screen to receive input signals from the target object. The touch panel includes one or more touch sensors to sense touches, swipes, and gestures on the touch panel. The touch sensors may not only sense a boundary of a touch or swipe action, but also sense a period of time and a pressure associated with the touch or swipe action.

The audio component 1110 is configured to output and/or input audio signals. For example, the audio component 1110 includes a microphone ("MIC") configured to receive an external audio signal when the electronic device 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like.

The sensor component 1114 includes one or more sensors to provide status assessments of various aspects of the electronic device 1100. For instance, the sensor component 1114 may detect an open/closed status of the electronic device 1100, relative positioning of components, e.g., the display and the keypad, of the electronic device 1100, a change in position of the electronic device 1100 or a component of the electronic device 1100, a presence or absence of contact between the target object and the electronic device 1100, an orientation or an acceleration/deceleration of the electronic device 1100, and a change in temperature of the electronic device 1100.

The communication component 1116 is configured to facilitate communication, wired or wirelessly, between the electronic device 1100 and other devices. The electronic device 1100 can access a wireless network based on a communication standard, such as WiFi, 2G, 3G, 4G, 5G, or a combination thereof. In one exemplary embodiment, the communication component 1116 receives a broadcast signal or broadcast associated information from an external broadcast management system via a broadcast channel. In one exemplary embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the electronic device 1100 may be implemented with one or more application specific integrated circuits (ASICs), digital signal processors (DSPs), digital signal processing devices (DSPDs), programmable logic devices (PLDs), field-programmable gate arrays (FPGAs), controllers, micro-controllers, microprocessors, or other electronic components, for performing the above described methods.

In exemplary embodiments, there is also provided a non-transitory computer-readable storage medium including executable computer programs, such as included the memory 1104 including instructions. The above-mentioned computer programs may be executed by the processor. The computer-readable storage medium may be a read only memory (ROM), a random access memory (RAM), a compact disc read only memory (CD-ROM), a magnetic tape, a floppy disc, an optical data storage device, and the like.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present invention is not limited to the exact construction that has been described above and illustrated in the accompanying drawings, and that various modifications and changes can be made without departing from the scope thereof. It is intended that the scope of the claimed invention is only limited by the appended claims.

What is claimed is:

1. A display control method, comprising:
   obtaining at least one frame of sensing data representing motion of a target object relative to an electronic device;
   predicting a target position while the target object is in contact with the electronic device according to the sensing data;
   determining a to-be-identified region according to the target position, wherein the to-be-identified region is a region containing the target position; and
   displaying preset information in the to-be-identified region, wherein the preset information indicates to input biometric information of the target object;
   wherein determining a to-be-identified region according to the target position comprises:
   obtaining a plurality of sub regions contained in a target region on the electronic device, wherein the target region is a display area facing a fingerprint sensor in the electronic device;
   predicting a sub region to be fallen into by the target object as the to-be-identified region according to the target position.

2. The method of claim 1, wherein, predicting the target position where the target object is in contact with the electronic device according to the sensing data comprises:
   determining a historical movement trajectory and a current moving direction of the target object based on the sensing data;
   predicting a target movement trajectory according to the historical movement trajectory and the current moving direction, wherein, the target movement trajectory occurs later than current time; and
   determining the target position based on the target movement trajectory.

3. The method of claim 1, wherein, determining the to-be-identified region according to the target position comprises:
   generating a region of a preset shape centered on the target position based on a preset size, and determining the region of the preset shape as the to-be-identified region.

4. The method of claim 1, wherein determining the to-be-identified region according to the target position comprises:
   obtaining a plurality of sub regions contained in a target region on the electronic device, and obtaining a central position of each sub region, wherein, the target region is a region on the electronic device capable to display the preset information;

obtaining a distance between the target position and the central position of each sub region; and determining a sub region corresponding to a minimum distance as the to-be-identified region.

5. The method of claim 1, wherein, the electronic device is provided with a touch sensor, and obtaining at least one frame of sensing data representing the motion of the target object relative to the electronic device comprises:

collecting a touch signal according to a preset period through the touch sensor; and identifying attribute information of the touch signal to obtain the sensing data, wherein, the attribute information comprises at least one of a size, quantity, and a characteristic of the touch signal.

6. The method of claim 5, wherein, the touch signal is a hovering touch signal.

7. The method of claim 1, wherein displaying the preset information in the to-be-identified region comprises at least one of:

displaying an icon for indicating to input biometric information in the to-be-identified region; and displaying a light spot for inputting biometric information in the to-be-identified region.

8. An electronic device, comprising:

a processor; and a memory storing computer programs executable by the processor;

wherein the processor executes the computer programs stored in the memory to implement a display control method, the method comprising:

obtaining at least one frame of sensing data representing motion of a target object relative to an electronic device;

predicting a target position while the target object is in contact with the electronic device according to the sensing data;

determining a to-be-identified region according to the target position, wherein the to-be-identified region is a region containing the target position; and displaying preset information in the to-be-identified region, wherein the preset information indicates to input biometric information of the target object;

wherein determining a to-be-identified region according to the target position comprises:

obtaining a plurality of sub regions contained in a target region on the electronic device, wherein the target region is a display area facing a fingerprint sensor in the electronic device;

predicting a sub region to be fallen into by the target object as the to-be-identified region according to the target position.

9. The electronic device of claim 8, wherein predicting the target position where the target object is in contact with the electronic device according to the sensing data comprises:

determining a historical movement trajectory and a current moving direction of the target object based on the sensing data;

predicting a target movement trajectory according to the historical movement trajectory and the current moving direction, wherein, the target movement trajectory occurs later than current time; and determining the target position based on the target movement trajectory.

10. The electronic device of claim 8, wherein determining the to-be-identified region according to the target position comprises:

generating a region of a preset shape centered on the target position based on a preset size, and determining the region of the preset shape as the to-be-identified region.

11. The electronic device of claim 8, wherein determining the to-be-identified region according to the target position comprises:

obtaining a plurality of sub regions contained in a target region on the electronic device, and obtaining a central position of each sub region, wherein the target region is a region on the electronic device capable to display the preset information;

obtaining a distance between the target position and the central position of each sub region; and determining a sub region corresponding to a minimum distance as the to-be-identified region.

12. The electronic device of claim 8, wherein the electronic device is provided with a touch sensor, and obtaining at least one frame of sensing data representing the motion of the target object relative to the electronic device comprises:

collecting a touch signal according to a preset period through the touch sensor; and identifying attribute information of the touch signal to obtain the sensing data, wherein, the attribute information comprises at least one of a size, quantity, and a characteristic of the touch signal.

13. The electronic device of claim 12, wherein the touch signal is a hovering touch signal.

14. The electronic device of claim 8, wherein displaying the preset information in the to-be-identified region comprises at least one of:

displaying an icon for indicating to input biometric information in the to-be-identified region; and displaying a light spot for inputting biometric information in the to-be-identified region.

15. A non-transitory computer readable storage medium having computer programs stored therein that, when executed by a processor, causes the processor to implement a display control method, the method comprising:

obtaining at least one frame of sensing data representing motion of a target object relative to an electronic device;

predicting a target position while the target object is in contact with the electronic device according to the sensing data;

determining a to-be-identified region according to the target position, wherein the to-be-identified region is a region containing the target position; and displaying preset information in the to-be-identified region, wherein the preset information indicates to input biometric information of the target object;

wherein determining a to-be-identified region according to the target position comprises:

obtaining a plurality of sub regions contained in a target region on the electronic device, wherein the target region is a display area facing a fingerprint sensor in the electronic device;

predicting a sub region to be fallen into by the target object as the to-be-identified region according to the target position.

16. The storage medium of claim 15, wherein predicting the target position where the target object is in contact with the electronic device according to the sensing data comprises:

determining a historical movement trajectory and a current moving direction of the target object based on the sensing data;
predicting a target movement trajectory according to the historical movement trajectory and the current moving direction, wherein, the target movement trajectory occurs later than current time; and
determining the target position based on the target movement trajectory.

17. The storage medium of claim 15, wherein, determining the to-be-identified region according to the target position comprises:
generating a region of a preset shape centered on the target position based on a preset size, and determining the region of the preset shape as the to-be-identified region.

* * * * *